United States Patent
Zhao et al.

(10) Patent No.: US 6,933,415 B2
(45) Date of Patent: Aug. 23, 2005

(54) LOW-VOC AQUEOUS COATING COMPOSITIONS WITH EXCELLENT FREEZE-THAW STABILITY

(75) Inventors: Cheng-Le Zhao, Charlotte, NC (US); Terri A. Cunningham, Concord, NC (US); Li Zhuo, Fort Mill, SC (US)

(73) Assignee: BASF AG, Ludwigshafen (DE)

( * ) Notice: Subject to any disclaimer, the term of this patent is extended or adjusted under 35 U.S.C. 154(b) by 150 days.

(21) Appl. No.: 10/163,953

(22) Filed: Jun. 6, 2002

(65) Prior Publication Data

US 2003/0229171 A1 Dec. 11, 2003

(51) Int. Cl.$^7$ .......................... C07C 41/05; C07C 43/15
(52) U.S. Cl. ...................... 568/616; 568/606; 568/654; 524/425; 524/492; 524/497
(58) Field of Search ................................ 524/425, 492, 524/497; 568/608, 616

(56) References Cited

U.S. PATENT DOCUMENTS

| | | | |
|---|---|---|---|
| 4,918,211 A | * 4/1990 | Yokota et al. | 558/31 |
| 5,324,862 A | 6/1994 | Yokota et al. | 568/608 |
| 5,332,854 A | 7/1994 | Yokota et al. | 558/33 |
| 5,530,056 A | 6/1996 | Farwaha et al. | 524/558 |
| 5,576,384 A | 11/1996 | Nölken et al. | 524/806 |
| 5,610,225 A | 3/1997 | Farwaha et al. | 524/558 |
| 5,618,876 A | 4/1997 | Farwaha et al. | 524/548 |
| 5,708,077 A | 1/1998 | Nölken et al. | 524/806 |
| 5,905,114 A | 5/1999 | Baumstark et al. | 524/801 |
| 6,054,526 A | 4/2000 | Betremieux et al. | 524/802 |
| 6,087,437 A | 7/2000 | Farwaha et al. | 524/555 |
| 2002/0045703 A1 | 4/2002 | Bassett et al. | |

FOREIGN PATENT DOCUMENTS

| | | | |
|---|---|---|---|
| EP | 0 764 666 | 9/1996 | ......... C08F/212/04 |
| EP | 896883 A1 | 2/1999 | |
| EP | 1114844 A1 | 7/2001 | |
| WO | WO 97/30127 | * 8/1997 | |

OTHER PUBLICATIONS

Abstract of Reports, entitled "Emulsion Polymers Institute" Lehigh University, Graduate Research Progress Reports, No. 54, Jul. 2000, Contents on 2 pages, and pages 91–99.
Montello Inc.—Polymerizable Surfactants—Properties and Applications/Specifications on 3 pages.
Designation: D 2243—82 (Reapproved 1987 entitled Standarf Test Method for Freeze–Thaw Resistance of Water–Borne paints, 64 T. Last previous ed. Apr. 30, 1982, vol. 06.01, on 2 pages.

* cited by examiner

*Primary Examiner*—Ling-Sui Choi

(57) ABSTRACT

The present invention is an aqueous coating composition having excellent freeze-thaw stability and a low-VOC content. The aqueous coating composition of the invention includes at least one latex polymer derived from at least one monomer and at least one polymerizable alkoxylated surfactant, at least one pigment, and water. In accordance with the invention, less than 3.0% by weight of anti-freeze agents based on the total weight of the aqueous coating composition are used in the composition. The present invention also includes a method of preparing an aqueous coating composition such as a latex paint including the above components.

35 Claims, No Drawings

LOW-VOC AQUEOUS COATING COMPOSITIONS WITH EXCELLENT FREEZE-THAW STABILITY

FIELD OF THE INVENTION

The present invention relates to the use of surfactants for reducing the VOC content of aqueous coating compositions such as paint and paper coating compositions while still maintaining the freeze-thaw stability of these compositions. In particular, the present invention relates to the use of certain polymerizable alkoxylated surfactants in latex polymers to reduce the VOC content of aqueous paint and paper coating compositions while maintaining the freeze-thaw stability of these compositions.

BACKGROUND OF THE INVENTION

Latex paints are used for a variety of applications including interior and exterior, and flat, semi-gloss and gloss applications. In order to provide latex paints with good film formation, coalescing agents are often added to these paints. Exemplary coalescing agents include 2,2,4-trimethyl-1,3-pentanediol monoisobutyrate (i.e. TEXANOL® commercially available from Eastman Chemical) and 2-ethylhexyl benzoate (i.e. VELATE® 378 commercially available from Vesicol Corporation).

In addition to coalescing agents, latex paints include anti-freeze agents to allow the paints to be used even after they have been subjected to freezing conditions. In addition, anti-freeze agents typically increase the open time for latex paints. Exemplary anti-freeze agents include ethylene glycol, diethylene glycol and propylene glycol. These anti-freeze agents are discussed in detail in "Antifreezes", Ulmann's Encyclopedia of Industrial Chemistry, $5^{th}$ ed., vol. A3, pages 23–31.

The additives used as coalescing agents and anti-freeze agents are effective for their purposes but are becoming more and more undesirable because they are volatile organic compounds (VOC's). After application of the latex paint to a substrate, the VOC's slowly evaporate into the surroundings. As permissible VOC levels continue to decrease as a result of increased environmental regulations, there has become a need in the art to produce latex paints with lower VOC levels. However, there is also a need to maintain the performance of latex paints even at these lower VOC levels.

SUMMARY OF THE INVENTION

It has been discovered that the use of certain polymerizable alkoxylated surfactants in aqueous coating compositions reduces the need to include anti-freeze agents in these compositions. In accordance with the invention, aqueous coating compositions (e.g. latex paints) including these polymerizable alkoxylated surfactants can be produced having excellent freeze-thaw stabilities with the addition of little or no anti-freeze agents. The aqueous coating compositions of the invention include less than 3.0% by weight and preferably less than 1.0% by weight of anti-freeze agents based on the total weight of the aqueous coating composition. More preferably, the aqueous coating compositions are substantially free of anti-freeze agents. Therefore, aqueous coating compositions can be produced in accordance with the invention that possess lower VOC levels than conventional aqueous coating compositions and thus that are more environmentally desirable.

The aqueous coating compositions of the invention include at least one latex polymer derived from at least one monomer and at least one polymerizable alkoxylated surfactant, at least one pigment, and water. The polymerizable alkoxylated surfactant used in the latex polymer has the structure:

$$R^1—R^2$$

wherein $R^1$ is an allyl group selected from the group consisting of $CH_3—CH=CH—$ and $CH_2=CH—CH_2—$, and $R^2$ is a radical comprising at least two carbon atoms and at least one oxyethylene or oxypropylene unit. Preferably, $R^2$ is $—C_6H_3(R^3)—O—(CH_2—CH_2—O)_n—R^4$, $—O—CH_2—CH(CH_2—O—C_6H_4—R^3)—O—(CH_2—CH_2—O)_n—R^4$, $—O—(CH_2—CH_2—O)_n—R^4$, $—O—(CH_2—CH(CH_3)—O)_n—R^4$, $—O—(CH_2—CH_2—O)_m—(CH_2—CH(CH_3)—O)_n—R^4$ or $—O—(CH_2—CH(CH_3)—O)_m—(CH_2—CH_2—O)_n—R^4$; $R^3$ is an alkyl group; $R^4$ is hydrogen or a polar group such as sulfonate ($—SO_3M$), sulfate ($—SO_4M$), phosphonate ($—PO_3M$) or phosphate ($—PO_4M$); M is $H^+$, $Na^+$, $NH_4^+$, $K^+$ or $Li^+$; n is from about 5 to about 100; and m is from 0 to about 100. More preferably, $R^3$ is $C_7$–$C_{13}$ alkyl (e.g. $C_9H_{19}$) and n is from about 10 to about 40.

In a preferred embodiment of the invention, the at least one pigment includes at least one pigment selected from the group consisting of $TiO_2$, $CaCO_3$, clay, aluminum oxide, silicon dioxide, magnesium oxide, sodium oxide, potassium oxide, talc, barytes, zinc oxide, zinc sulfite and mixtures thereof. More preferably, the at least one pigment includes $TiO_2$, calcium carbonate or clay. The at least one latex polymer in the aqueous coating composition can be a pure acrylic, a styrene acrylic, a vinyl acrylic or an acrylated ethylene vinyl acetate copolymer and is more preferably a pure acrylic. The at least one latex polymer is preferably derived from at least one acrylic monomer selected from the group consisting of acrylic acid, acrylic acid esters, methacrylic acid, and methacrylic acid esters. For example, the at least one latex polymer can be a butyl acrylate/methyl methacrylate copolymer or a 2-ethylhexyl acrylate/methyl methacrylate copolymer. Typically, the at least one latex polymer is further derived from one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4–C8 conjugated dienes. In addition to the above components, the aqueous coating composition can include one or more additives selected from the group consisting of dispersants, surfactants, rheology modifiers, defoamers, thickeners, biocides, mildewcides, colorants, waxes, perfumes and co-solvents.

The present invention further includes a method of preparing an aqueous coating composition, comprising the step of preparing the polymer latex binder using emulsion polymerization by feeding monomers to a reactor in the presence of at least one initiator and the at least one polymerizable surfactant as described above and polymerizing the monomers and the polymerizable surfactant to produce the latex binder. The at least one pigment and other additives can then be mixed with the resulting latex binder to produce the aqueous coating composition. The step of preparing the polymer latex binder can include preparing an initiator solution comprising the initiator, preparing a monomer pre-emulsion comprising monomers and the polymerizable alkoxylated surfactant of the present invention, adding the initiator solution to a reactor, and adding the monomer pre-emulsion to the reactor. The incorporation of the polymerizable alkoxylated surfactants in the polymer latex enables the coating composition to have a lower VOC content while maintaining the freeze-thaw stability of the aqueous coating composition at desirable levels.

These and other features and advantages of the present invention will become more readily apparent to those skilled in the art upon consideration of the following detailed description, which describe both the preferred and alternative embodiments of the present invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present invention is an aqueous coating composition having a low-VOC content but that has excellent freeze-thaw stability comparable to conventional aqueous coating compositions. The aqueous coating composition of the invention includes at least one latex polymer derived from at least one monomer and at least one polymerizable alkoxylated surfactant, at least one pigment and water.

The at least one latex polymer used in the aqueous coating composition is preferably derived from monomers comprising at least one acrylic monomer selected from the group consisting of acrylic acid, acrylic acid esters, methacrylic acid, and methacrylic acid esters. In addition, the latex polymer can optionally include one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids (e.g. vinyl esters commercially available under the mark VEOVA® from Shell Chemical Company or sold as EXXAR® Neo Vinyl Esters by ExxonMobil Chemical Company), itaconic acid, crotonic acid, maleic acid, fumaric acid, and ethylene. It is also possible to include C4–C8 conjugated dienes such as 1,3-butadiene, isoprene and chloroprene. Preferably, the monomers include one or more monomers selected from the group consisting of n-butyl acrylate, methyl methacrylate, styrene and 2-ethylhexyl acrylate. The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate, as would be readily understood by those skilled in the art. In a particularly preferred embodiment, the latex polymer is a pure acrylic such as a butyl acrylate/methyl methacrylate copolymer derived from monomers including butyl acrylate and methyl methacrylate. The latex polymer dispersion preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

The at least one polymerizable alkoxylated surfactant used to form the polymer latex has the structure:

wherein $R^1$ is an allyl group selected from the group consisting of $CH_3-CH=CH-$ and $CH_2=CH-CH_2-$, and $R^2$ is a radical comprising at least two carbon atoms and at least one oxyethylene or oxypropylene unit. Preferably, $R^2$ is $-C_6H_3(R^3)-O-(CH_2-CH_2-O)_n-R^4$, $-O-CH_2-CH(CH_2-O-C_6H_4-R^3)-O-(CH_2-CH_2-O)_n-R^4$, $-O-(CH_2-CH_2-O)_n-R^4$, $-O-(CH_2-CH(CH_3)-O)_n-R^4$, $-O-(CH_2-CH_2-O)_m-(CH_2-CH(CH_3)-O)_n-R^4$ or $-O-(CH_2-CH(CH_3)-O)_m-(CH_2-CH_2-O)_n-R^4$; $R^3$ is an alkyl group; $R^4$ is hydrogen or a polar group such as sulfonate ($-SO_3M$), sulfate ($-SO_4M$), phosphonate ($-PO_3M$) or phosphate ($-PO_4M$); M is $H^+$, $Na^+$, $NH_4^+$, $K^+$ or $Li^+$; n is from about 5 to about 100; and m is from 0 to about 100. More preferably, $R^3$ is $C_7$–$C_{13}$ alkyl (e.g. $C_9H_{19}$) and n is from about 10 to about 40. The term "alkyl" as used herein includes linear and branched alkyl groups. Suitable surfactants for use in the invention include surfactants sold under the marks NOIGEN® RN and HITENOL® BC and are commercially available from Montello, Inc. For example, NOIGEN® RN-10, HITENOL® BC-10 and HITENOL® BC-20 can be used in the invention. The surfactant is typically present in the aqueous polymer dispersion in an amount from greater than 0 to about 5% by weight based on polymer weight, more preferably from about 0.5 to about 3% by weight based on polymer weight.

As mentioned above, the aqueous coating composition includes at least one pigment. The term "pigment" as used herein includes non-film-forming solids such as pigments, extenders, and fillers. The at least one pigment is preferably selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks MINEX® (oxides of silicon, aluminum, sodium and potassium commercially available from Unimin Specialty Minerals), CELITES® (aluminum oxide and silicon dioxide commercially available from Celite Company), ATOMITES® (commercially available from English China Clay International), and ATTAGELS® (commercially available from Engelhard). More preferably, the at least one pigment includes $TiO_2$, $CaCO_3$ or clay. Generally, the mean particle sizes of the pigments range from about 0.01 to about 50 microns. For example, the $TiO_2$ particles used in the aqueous coating composition typically have a mean particle size of from about 0.15 to about 0.40 microns. The pigment can be added to the aqueous coating composition as a powder or in slurry form. The pigment is preferably present in the aqueous coating composition in an amount from about 5 to about 50 percent by weight, more preferably from about 10 to about 40 percent by weight.

The coating composition can optionally contain additives such as one or more film-forming aids or coalescing agents.

Suitable firm-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, biocides, mildewcides, colorants such as colored pigments and dyes, waxes, perfumes, co-solvents, and the like, can also be used in accordance with the invention. For example, non-ionic and/or ionic (e.g. anionic or cationic) surfactants can be used to produce the polymer latex. These additives are typically present in the aqueous coating composition in an amount from 0 to about 15% by weight, more preferably from about 1 to about 10% by weight based on the total weight of the coating composition.

As mentioned above, the aqueous coating composition includes less than 3.0% of anti-freeze agents based on the total weight of the aqueous coating composition. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More preferably, the aqueous coating composition includes less than 1.0% or is substantially free (e.g. includes less than 0.1%) of anti-freeze agents. Accordingly, the aqueous coating composition of the invention preferably has a VOC level of less than about 100 g/L and more preferably less than or equal to about 50 g/L. Despite the fact that the aqueous coating compositions of the invention include little or no anti-freeze agents, the compositions possess freeze-thaw stabilities at levels desirable in the art. For example, the aqueous coating compositions of the invention can be subjected to freeze-thaw cycles using ASTM method D2243-82 without coagulation. The aqueous coating compositions can also pass a draw-down test performed by the method discussed below. Furthermore, the aqueous coating compositions of the invention exhibit good heat storage stability and exhibit Stormer viscosity increases of less than 15 KU, more preferably of 10 KU or lower, after being stored for 14 days at 50° C. by the method discussed below.

The balance of the aqueous coating composition of the invention is water. Although much of the water is present in the polymer latex dispersion and in other components of the aqueous coating composition, water is generally also added separately to the aqueous coating composition. Typically, the aqueous coating composition includes from about 10% to about 85% by weight and more preferably from about 35% to about 80% by weight water. Stated differently, the total solids content of the aqueous coating composition is typically from about 15% to about 90%, more preferably, from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, biocides, mildewcides, colorants, waxes, and the like, that do not evaporate upon drying of the coating composition.

In one preferred embodiment of the invention, the aqueous coating composition is a latex paint composition comprising at least one latex polymer derived from at least one acrylic monomer selected from the group consisting of acrylic acid, acrylic acid esters, methacrylic acid, and methacrylic acid esters and at least one polymerizable alkoxylated surfactant; at least one pigment and water. As mentioned above, the at least one latex polymer can be a pure acrylic, a styrene acrylic, a vinyl acrylic or an acrylated ethylene vinyl acetate copolymer.

The present invention further includes a method of preparing an aqueous coating composition by mixing together at least one latex polymer derived from at least one monomer and at least one polymerizable alkoxylated surfactant as described above, and at least one pigment. Preferably, the latex polymer is in the form of a latex polymer dispersion. The additives discussed above can be added in any suitable order to the latex polymer, the pigment, or combinations thereof, to provide these additives in the aqueous coating composition. In the case of paint formulations, the aqueous coating composition preferably has a pH of from 7 to 10.

The latex polymer including the polymerizable alkoxylated surfactants of the invention can be used in combination with other ionic or non-ionic type of surfactants that are either polymerizable or non-polymerizable, in the aqueous coating composition. In particular, the polymer latex binder can be prepared using emulsion polymerization by feeding the monomers used to form the latex binder to a reactor in the presence of at least one initiator and the at least one polymerizable alkoxylated surfactant of the invention and polymerizing the monomers to produce the latex binder. The monomers fed to a reactor to prepare the polymer latex binder preferably include at least one acrylic monomer selected from the group consisting of acrylic acid, acrylic acid esters, methacrylic acid, and methacrylic acid esters. In addition, the monomers can include styrene, vinyl acetate, or ethylene. The monomers can also include one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, and ethylene. It is also possible to include C4–C8 conjugated dienes such as 1,3-butadiene, isoprene or chloroprene. Preferably, the monomers include one or more monomers selected from the group consisting of n-butyl acrylate, methyl methacrylate, styrene and 2-ethylhexyl acrylate. The initiator can be any initiator known in the art for use in emulsion polymerization such as ammonium or potassium persulfate, or a redox system that typically includes an oxidant and a reducing agent. Commonly used redox initiation systems are described e.g., by A. S. Sarac in *Progress in Polymer Science* 24(1999), 1149–1204.

The polymer latex binder can be produced by first preparing an initiator solution comprising the initiator and water. A monomer pre-emulsion is also prepared comprising at least a portion of the monomers to be used to form the latex polymer, one or more surfactants, water, and additional additives such as NaOH. The one or more surfactants in the monomer pre-emulsion include the polymerizable alkoxylated surfactant of the invention. The initiator solution and monomer pre-emulsion are then continuously added to the reactor over a predetermined period of time (e.g. 1.5–5 hours) to cause polymerization of the monomers and to thereby produce the latex polymer. Preferably, at least a portion of the initiator solution is added to the reactor prior to adding the monomer pre-emulsion. Prior to the addition of the initiator solution and the monomer pre-emulsion, a seed latex such as a polystyrene seed latex can be added to the reactor. In addition, water, one or more surfactants, and any monomers not provided in the monomer pre-emulsion can be added to the reactor prior to adding the initiator and adding the monomer pre-emulsion. The reactor is operated at an elevated temperature at least until all the monomers are fed to produce the polymer latex binder. Once the polymer latex binder is prepared, it is preferably chemically stripped thereby decreasing its residual monomer content. Preferably, it is chemically stripped by continuously adding an oxidant such as a peroxide (e.g. t-butylhydroperoxide) and a reducing agent (e.g. sodium acetone bisulfite), or another redox pair such as those described by A. S. Sarac in *Progress in Polymer Science* 24(1999), 1149–1204, to the latex binder at an elevated temperature and for a predetermined period of time (e.g. 0.5 hours). The pH of the latex binder can then be adjusted and a biocide or other additives added after the chemical stripping step.

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

The present invention will now be further described by the following non-limiting examples.

EXAMPLE 1 (E1)

Example 1 illustrates the preparation of a polymer dispersion containing 2.0% (weight percent of active material based on dry polymer weight) NOIGEN® RN-10 surfactant (commercially available from Montello, Inc. representing Dai-Ichi Kogyo Seiyaku Co., Ltd.). NOIGEN® RN-10 surfactant has the following structure:

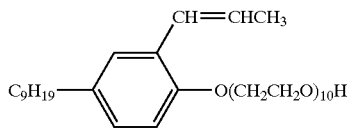

A monomer pre-emulsion was prepared by emulsifying 264 parts water, 37.5 parts CALSOFT® L-40 surfactant (a sodium linear or branched alkyl benzene sulfonate surfactant commercially available from Pilot Chemical), 20.0 parts NOIGEN® RN-10 surfactant, 15.0 parts NaOH solution (10% solution in water), 7.5 parts itaconic acid, 20 parts ureido methacrylate, 511.2 parts n-butyl acrylate and 461.0 parts methyl methacrylate. The initiator solution was prepared by dissolving 2.5 parts ammonium persulfate in 47.5 parts water. A 2-liter stirred glass reactor filled with 272.4 parts deionized water and 3.14 parts of a 33% polystyrene seed latex was purged with nitrogen and heated to 85° C. When the temperature was reached, the initiator solution was continuously fed into the reactor over 4.5 hours and the monomer pre-emulsion was continuously fed into the reactor over 4.0 hours. The reaction was further allowed to continue for 30 minutes before being cooled down to 60° C.

To further reduce the residual monomer level, a chemical stripping step was conducted. A peroxide solution was prepared consisting of 1.43 parts of t-butylhydroperoxide solution (tBHP, 70% in water) and 6.7 parts of sodium acetone bisulfite solution (SABS) and fed to the reactor over 45 minutes. After the addition of tBHP and SABS, the reactor was maintained at 60° C. for 30 minutes before being cooled down to room temperature. The pH of the latex was adjusted to 8.3 with concentrated ammonia. The resulting polymer dispersion had a solids content of 60.1% and a diameter of 280 nm by photocorrelation spectroscopy.

EXAMPLE 2 (E2)

Example 2 illustrates the preparation of a polymer dispersion containing 2.0% (weight percent of active material based on dry polymer weight) HITENOL® BC-10 surfactant (commercially available from Montello, Inc. representing Dai-Ichi Kogyo Seiyaku Co., Ltd.). HITENOL® BC-10 surfactant has the following structure:

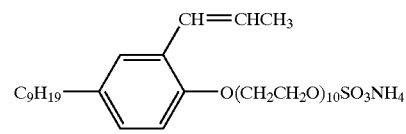

The ingredients and process used for synthesis were the same as used in Example 1 except 20.0 parts of HITENOL® BC-10 surfactant was used instead of NOIGEN® RN-10 surfactant. The resulting polymer dispersion had a solids content of 60.5% and a diameter of 280 nm by photocorrelation spectroscopy.

EXAMPLE 3 (E3)

Example 3 illustrates the preparation of a polymer dispersion containing 2.0% (weight percent of active material based on dry polymer weight) HITENOL® BC-20 surfactant (commercially available from Montello, Inc. representing Dai-Ichi Kogyo Seiyaku Co., Ltd.). HITENOL® BC-20 surfactant has the following structure:

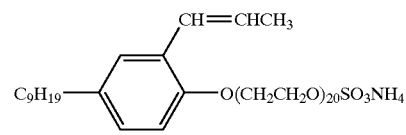

The ingredients and process used for synthesis were the same as used in Example 1 except 20.0 parts of HITENOL® BC-20 surfactant was used instead of NOIGEN® RN-10 surfactant. The resulting polymer dispersion had a solids content of 59.8% and a diameter of 280 nm by photocorrelation spectroscopy.

COMPARATIVE EXAMPLE 1 (CE1)

Comparative Example 1 illustrates the preparation of a polymer dispersion containing 2.0% (weight percent of active material based on dry polymer weight) LUTENSOL® AP-10 surfactant (commercially available from BASF Corporation). LUTENSOL® AP-10 has the following structure:

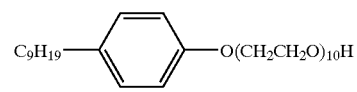

The ingredients and process used for synthesis were the same as used in Example 1 except 20.0 parts of LUTENSOL® AP-10 surfactant was used instead of NOIGEN® RN-10 surfactant. The resulting polymer dispersion had a solids content of 61.15% and a diameter of 280 nm by photocorrelation spectroscopy.

COMPARATIVE EXAMPLE 2 (CE2)

Comparative Example 2 illustrates the preparation of a polymer dispersion containing 2.0% (weight percent of active material based on dry polymer weight) IGEPAL® CA 877 surfactant (commercially available from GAF Corporation). IGEPAL® CA 877 surfactant has the following structure:

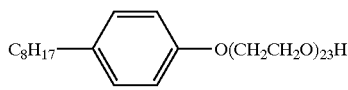

The ingredients and process used for synthesis were the same as used in Example 1 except 20.0 parts of IGEPAL® CA 877 surfactant (70% activity) was used instead of NOIGEN® RN-10 surfactant. The resulting polymer dispersion had a solids content of 60.16% and a diameter of 280 nm by photocorrelation spectroscopy.

COMPARATIVE EXAMPLE 3 (CE3)

Comparative Example 3 illustrates the preparation of a polymer dispersion containing 2.0% (weight percent of active material based on dry polymer weight) EMULGATOR® 925 S surfactant (commercially available from BASF Corporation). EMULGATOR® 925 S surfactant has the following structure:

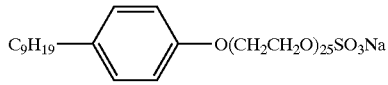

The ingredients and process used for synthesis were the same as used in Example 1 except 20.0 parts of EMULGATOR® 925 S surfactant (70% activity) was used instead of NOIGEN® RN-10 surfactant. The resulting polymer dispersion had a solids content of 60.89% and a diameter of 280 nm by photocorrelation spectroscopy.

Paint Formulation

The following flat paint formulation with a total VOC level of 50 g/L was used for evaluating paint performance:

| Ingredients | Parts by Weight |
| --- | --- |
| Water | 193.3 |
| PROXEL ® GXL[1] | 2.0 |
| Propylene Glycol | 7.2 |
| NATROSOL ® 330 Plus[2] | 3.2 |
| 2-Amino-2-Methyl-Propanol (AMP-95) | 1.0 |
| TAMOL ® 1124[3] | 6.8 |
| TRITON ® CF-10[4] | 3.0 |
| FOAMASTER ® S[5] | 3.0 |
| TIONA ® RCL-535[6] TiO$_2$ particles | 220.1 |
| MINEX ® 4[7] | 171.2 |
| ICECAP ® K[8] | 63.6 |
| Water | 123.5 |
| FOAMASTER ® S | 3.9 |
| NOPCO ® DSX 2000[9] | 3.9 |
| TEXANOL ®[10] | 2.0 |
| POLYPHASE ® AF1[11] | 6.0 |
| Polymer Dispersion (60% solids) | 337.7 |
| Water | 20.0 |

The above components were mixed in the above order using a high-speed disperser (Dispermat from VMA-Getzmann in Reichshof Germany).
[1]PROXEL ® GXL is a biocide based on 1,2-benzisothiazolin-3-one commercially available from Zeneca.
[2]NATROSOL ® 330 Plus is hydroxyethylcellulose based polymer thickener commercially available from Aqualon Specialties.
[3]TAMOL ® 1124 is a low molecular weight, ammonium-based, hydrophilic polymer dispersant comprising 50% solids and commercially available from Robin and Haas.
[4]TRITON ® CE-10 is a modified alkylaryl polyether surfactant commercially available from Union Carbide.
[5]FOAMASTER ® S is a defoamer based on a proprietary blend of esters, oils, and silica derivatives commercially available from Henkel Corporation.
[6]TIONA ® RCL-535 TiO2 particles commercially available from Millennium Inorganic Chemicals.
[7]MINEX ® 4 is a nepheline syenite extender commercially available from Unimin Specialty Minerals.
[8]ICECAP ® K is an anhydrous kaolin clay commercially available from Burgess Pigment Company.
[9]NOPCO ® DSX 2000 is a thickener commercially available from Henkel Corporation.
[10]TEXANOL ® is a 2,2,4-trimethyl-1,3-pentanediol mono(2-methylpropanoate) coalescing agent commercially available from Eastman Chemical.
[11]POLYPHASE ® AF1 is a fungicide commercially available from G. R. O'Shea Company.

Test Methods

Stormer Viscosity (in KU, Krebs Units): The Stormer viscosity was measured according to ASTM D 562-81.

ICI Viscosity (in Poise): The high shear ICI viscosity was measured according to ASTM D 4287-94.

Heat Storage Stability: The heat storage stability of the paints was tested by measuring the Stormer viscosity (KU) increase after storing the paints in an 8 oz. glass jar for 14 days in a drying oven at 50° C.

Freeze-Thaw Stability: The high freeze-thaw stability of the paints was tested according to ASTM D 2243-82. The freezer temperature was set at −18° C. Stormer viscosities were measured after each freeze-thaw cycle, if the paint did not coagulate.

Draw-Down of Films: After the third freeze-thaw cycle, a draw-down of the paint was made on white sealed paper (Plain Leneta white paper chart) with a 7 mil (about 180 µm thickness) blade. A pass or failure note was given based on the grit level in the dried paint film. A paint film with no or sporadic microcoagulum was rated a "pass" and a paint film with a large amount of coagulum was rated a "fail". The rating gives information on freeze-thaw stability of the paint to supplement the Stormer viscosity measurement.

Paint Test Results

The test results of the flat paint formulations based on the latices from Examples 1–3 and Comparative Examples 1–3 are summarized in Table 1 below.

TABLE 1

|  | Example 1 | Example 2 | Example 3 | Comparative Example 1 | Comparative Example 2 | Comparative Example 3 |
|---|---|---|---|---|---|---|
| Stormer Viscosity (KU) | 86 | 87 | 76 | 80 | 72 | 76 |
| ICI Viscosity (poise) | 0.64 | 0.65 | 0.54 | 0.78 | 0.63 | 0.72 |
| Heat Storage Stability (ΔKU:KU increase after 2 weeks at 50° C. | 10 | 9 | 10 | 16 | 17 | 26 |
| Freeze-Thaw Stability (KU after 1, 2, 3, 4, 5 cycles) | 96/94/89/91/91 | 96/97/92/92/93 | 85/85/81/81/84 | Fail after 1 cycle | Fail after 1 cycle | Fail after 1 cycle |
| Grit in Draw Down Films after 3 Freeze-Thaw Cycles | Pass | Pass | Pass | Fail | Fail | Fail |

The test results in Table 1 show that the polymerizable surfactants of the present invention improve the freeze-thaw stability of the paints in which they are used compared to paints at equivalent VOC levels using conventional, non-polymerizable surfactants. This is further evidenced by the reduced grit level in the latex paints produced using the surfactants of the invention. Accordingly, the amount of anti-freeze agents used in the latex paints can be reduced when the polymerizable surfactants of the invention are used in the manufacture of these paints without sacrificing the freeze-thaw stability of these paints. Latex paints produced using the surfactants of the invention also exhibit improved heat storage stability over latex paints using conventional additives. Furthermore, the surfactants of the invention allow latex paints to be produced with the above-described properties at low or zero-VOC levels. Therefore, the latex paints produced according to the invention are more environmentally safe than conventional paints.

It is understood that upon reading the above description of the present invention, one skilled in the art could make changes and variations therefrom. These changes and variations are included in the spirit and scope of the following appended claims.

What is claimed is:

1. A aqueous coating composition, comprising:
   (a) at least one latex polymer derived from at least one monomer and at least one polymerizable alkoxylated surfactant having the structure:

$R^1-R^2$ 

wherein $R^1$ is an allyl group selected from the group consisting of $CH_3-CH=CH-$ and $CH_2=CH-CH_2-$, and $R^2$ is $-O-CH_2-CH(CH_2-O-C_6H_4-R^3)-O-(CH_2-CH_2-O)_n-R^4$, $-O-(CH_2-CH_2-O)_n-R^4$, $-O-(CH_2-CH(CH_3)-O)_n-R^4$, $-O-(CH_2-CH_2-O)_m-(CH_2-CH(CH_3)-O)_n-R^4$ or $-O-(CH_2-CH(CH_3)-O)_m-(CH_2-CH_2-O)_n-R^4$; $R^3$ is an alkyl group; $R^4$ is hydrogen, sulfonate ($-SO_3M$), sulfate ($-SO_4M$), phosphonate ($-PO_3M$) or phosphate ($-PO_4M$); M is $H^+$, $Na^+$, $NH_4^+$, $K^+$ or $Li^+$; n is from about 5 to about 100; and m is from 0 to about 100;
   (b) at least one pigment;
   (c) water; and
   (d) less than 3.0% by weight based on the total weight of the aqueous coating composition of anti-freeze agents.

2. The composition according to claim 1, comprising less than 1.0% by weight based on the total weight of the aqueous coating composition of anti-freeze agents.

3. The composition according to claim 1, being substantially free of anti-freeze agents.

4. The composition according to claim 1, wherein $R^3$ is $C_7-C_{13}$ alkyl.

5. The composition according to claim 1, wherein $R^3$ is $C_9H_{19}$.

6. The composition according to claim 1, wherein n is from about 10 to about 40.

7. The composition according to claim 1, wherein the at least one pigment includes at least one pigment selected from the group consisting of $TiO_2$, clay, $CaCO_3$, aluminum oxide, silicon dioxide, magnesium oxide, talc (magnesium silicate), barytes (barium sulfate), zinc oxide, zinc sulfite, sodium oxide, potassium oxide and mixtures thereof.

8. The composition according to claim 1, wherein the at least one pigment includes $TiO_2$, calcium carbonate or clay.

9. The composition according to claim 1, wherein the inorganic pigment includes $TiO_2$.

10. The composition according to claim 1, wherein the at least one monomer is selected from the group consisting of pure acrylics monomers, styrene and acrylics monomers, vinyl acrylics monomers, and acrylated ethylene vinyl acetate monomer.

11. The composition according to claim 1, wherein the at least one monomer includes a pure acrylic monomer.

12. The composition according to claim 11, wherein the at least one latex polymer is derived from at least one acrylic monomer selected from the group consisting of acrylic acid, acrylic acid esters, methacrylic acid, and methacrylic acid esters.

13. The composition according to claim 12, wherein the at least one latex polymer is further derived from one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4–C8 conjugated dienes.

14. The composition according to claim 1, further comprising one or more additives selected from the group consisting of dispersants, surfactants, rheology modifiers, defoamers, thickeners, biocides, mildewcides, colorants, waxes, perfumes and co-solvents.

15. A latex paint composition, comprising:
(a) at least one latex polymer derived from at least one monomer and at least one polymerizable alkoxylated surfactant having the structure:

wherein $R^1$ is an allyl group selected from the group consisting of $CH_3$—CH=CH— and $CH_2$=CH—$CH_2$—; $R^2$ is —O—$CH_2$—$CH(CH_2$—O—$C_6H_4$—$R^3$)—O—($CH_2$—$CH_2$—O)$_n$—$R^4$, —O—($CH_2$—$CH_2$—O)$_n$—$R^4$, —O—($CH_2$—$CH(CH_3)$—O)$_n$—$R^4$, —O—($CH_2$—$CH_2$—O)$_m$—($CH_2$—$CH(CH_3)$—O)$_n$—$R^4$ or —O—($CH_2$—$CH(CH_3)$—O)$_m$—($CH_2$—$CH_2$—O)$_n$—$R^4$; $R^3$ is an alkyl group; $R^4$ is hydrogen, sulfonate (—$SO_3M$), sulfate (—$SO_4M$), phosphonate (—$PO_3M$) or phosphate (—$PO_4M$); M is $H^+$, $Na^+$, $NH_4^+$, $K^+$ or $Li^+$; n is from about 5 to about 100; and m is from 0 to about 100;
(b) at least one latex polymer derived from at least one acrylic monomer selected from the group consisting of acrylic acid, acrylic acid esters, methacrylic acid, and methacrylic acid esters;
(c) at least one pigment;
(d) water; and
(e) less than 3.0% by weight based on the total weight of the aqueous coating composition of anti-freeze agents.

16. The paint composition according to claim 15, wherein $R^3$ is $C_7$–$C_{13}$ alkyl.

17. The paint composition according to claim 15, wherein the latex polymer of (b) is a pure acrylic latex polymer.

18. The paint composition according to claim 17, wherein the latex polymer of (b) is a butyl acrylate/methyl methacrylate copolymer.

19. A method of preparing a aqueous coating composition, comprising the step of: mixing
(1) at least one latex polymer derived from at least one monomer and at least one polymerizable alkoxylated surfactant having the structure:

wherein $R^1$ is an allyl group selected from the group consisting of $CH_3$—CH=CH— and $CH_2$=CH—$CH_2$—, and $R^2$ is —O—$CH_2$—$CH(CH_2$—O—$C_6H_4$—$R^3$)—O—($CH_2$—$CH_2$—O)$_n$—$R^4$, —O—($CH_2$—$CH_2$—O)$_n$—$R^4$, —O—($CH_2$—$CH(CH_3)$—O)$_n$—$R^4$, —O—($CH_2$—$CH_2$—O)$_m$—($CH_2$—$CH(CH_3)$—O)$_n$—$R^4$ or —O—($CH_2$—$CH(CH_3)$—O)$_m$—($CH_2$—$CH_2$—O)$_n$—$R^4$; $R^3$ is an alkyl group; $R^4$ is hydrogen, sulfonate (—$SO_3M$), sulfate (—$SO_4M$), phosphonate (—$PO_3M$) or phosphate (—$PO_4M$); M is $H^+$, $Na^+$, $NH_4^+$, $K^+$ or $Li^+$; n is from about 5 to about 100; and m is from 0 to about 100; and
(2) at least one pigment;
wherein the aqueous coating composition includes less than 3.0% by weight based on the total weight of the aqueous coating composition of anti-freeze agents.

20. The method according to claim 19, wherein $R^3$ is $C_7$–$C_{13}$ alkyl.

21. The method according to claim 19, wherein $R^3$ is $C_9H_{19}$.

22. The method according to claim 19, wherein n is from about 10 to about 40.

23. The method according to claim 19, wherein the pigment is at least one pigment selected from the group consisting of $TiO_2$, clay, $CaCO_3$, aluminum oxide, silicon dioxide, magnesium oxide, talc (magnesium silicate), barytes (barium sulfate), zinc oxide, zinc sulfite, sodium oxide, potassium oxide and mixtures thereof.

24. The method according to claim 19, wherein the pigment includes $TiO_2$, calcium carbonate or clay.

25. The method according to claim 19, wherein the pigment includes $TiO_2$.

26. The method according to claim 19, wherein said mixing step comprises mixing at least one latex polymer selected from the group consisting of pure acrylics, styrene acrylics, vinyl acrylics and acrylated ethylene vinyl acetate copolymers.

27. The method according to claim 19, wherein the at least one latex polymer includes a pure acrylic.

28. The method according to claim 19, wherein the at least one latex polymer is derived from at least one acrylic monomer selected from the group consisting of acrylic acid, acrylic acid esters, methacrylic acid, and methacrylic acid esters.

29. The method according to claim 28, wherein the at least one latex polymer is further derived from one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4–C8 conjugated dienes.

30. The method according to claim 19, wherein said mixing step comprises further mixing at least one additive selected from the group consisting of dispersants, surfactants, rheology modifiers, defoamers, thickeners, biocides, mildewcides, colorants, waxes, perfumes and co-solvents.

31. The method according to claim 19, further comprising the step of preparing the polymer latex binder using emulsion polymerization by feeding the at least one monomer to a reactor in the presence of at least one initiator and the at least one polymerizable surfactant and polymerizing the monomers to produce the latex binder, wherein said mixing step comprises mixing the at least one pigment with the resulting latex binder to produce the aqueous coating composition.

32. The method according to claim 31, wherein said step of preparing the polymer latex binder comprises:
preparing an initiator solution comprising the initiator;
preparing a monomer pre-emulsion comprising the at least one monomer and the at least one polymerizable surfactant;
adding the initiator solution to a reactor; and
adding the monomer pre-emulsion to the reactor.

33. The method according to claim 31, wherein said preparing step comprises feeding monomers to a reactor comprising at least one acrylic monomer selected from the group consisting of acrylic acid, acrylic acid esters, methacrylic acid, and methacrylic acid esters.

34. The method according to claim 33, wherein said preparing step comprises feeding monomers to a reactor further comprising one or more monomers selected from the group consisting of styrene, α-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4–C8 conjugated dienes.

35. In a method for reducing the VOC content of an aqueous coating composition comprising a polymer latex, a pigment and water, without substantially reducing the freeze-thaw stability of the aqueous coating composition, the improvement comprising preparing the latex polymer used in the aqueous coating composition from at least one monomer and at least one polymerizable alkoxylated surfactant, the at least one polymerizable alkoxylated surfactant having the structure:

$R^1\text{—}R^2$ wherein $R^1$ is an allyl group selected from the group consisting of $CH_3\text{—}CH\text{=}CH\text{—}$ and $CH_2\text{=}CH\text{—}CH_2\text{—}$, and $R^2$ is —O—$CH_2$—CH($CH_2$—O—$C_6H_4$—$R^3$)—O—($CH_2$—$CH_2$—O)$_n$—$R^4$, —O—($CH_2$—$CH_2$—O)$_n$—$R^4$, —O—($CH_2$—CH($CH_3$)—O)$_n$—$R^4$, —O—($CH_2$—$CH_2$—O)$_m$—($CH_2$—CH($CH_3$)—O)$_n$—$R^4$ or —O—($CH_2$—CH($CH_3$)—O)$_m$—($CH_2$—$CH_2$—O)$_n$—$R^4$; $R^3$ is an alkyl group; $R^4$ is hydrogen, sulfonate (—$SO_3M$), sulfate (—$SO_4M$), phosphonate (—$PO_3M$) or phosphate (—$PO_4M$); M is $H^+$, $Na^+$, $NH_4^+$, $K^+$ or $Li^+$; n is from about 5 to about 100; and m is from 0 to about 100.

* * * * *

UNITED STATES PATENT AND TRADEMARK OFFICE
CERTIFICATE OF CORRECTION

PATENT NO. : 6,933,415 B2
APPLICATION NO. : 10/163953
DATED : August 23, 2005
INVENTOR(S) : Zhao et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (150) days Delete the phrase "by 150" and insert -- by 415 days --

Signed and Sealed this

Thirty-first Day of October, 2006

JON W. DUDAS
*Director of the United States Patent and Trademark Office*